(12) United States Patent
Kairali et al.

(10) Patent No.: US 12,438,920 B2
(45) Date of Patent: Oct. 7, 2025

(54) USING A HANDSHAKE TO COMMUNICATE BETWEEN A SECURITY AND COMPLIANCE CENTER (SCC) AND AT LEAST A FIRST OPERATOR

(71) Applicant: International Business Machines Corporation, Armonk, NY (US)

(72) Inventors: Sudheesh S. Kairali, Kozhikode (IN); Sudhanshu Sekher Sar, Bangalore (IN); Sarbajit K. Rakshit, Kolkata (IN); Satyam Jakkula, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 17/880,560

(22) Filed: Aug. 3, 2022

(65) Prior Publication Data
US 2024/0048597 A1 Feb. 8, 2024

(51) Int. Cl.
*G06F 15/16* (2006.01)
*H04L 9/40* (2022.01)

(52) U.S. Cl.
CPC .......... *H04L 63/205* (2013.01); *H04L 63/102* (2013.01); *H04L 63/1433* (2013.01)

(58) Field of Classification Search
CPC .. H04L 63/102; H04L 63/1433; H04L 63/205
USPC ........................................................ 709/227
See application file for complete search history.

(56) References Cited

U.S. PATENT DOCUMENTS

| | | | |
|---|---|---|---|
| 2013/0205128 A1* | 8/2013 | Thompson | G06F 8/65 713/1 |
| 2015/0067761 A1 | 3/2015 | Bade et al. | |
| 2015/0082378 A1* | 3/2015 | Collison | H04L 63/20 726/1 |
| 2015/0169415 A1* | 6/2015 | Hildebrand | G06F 11/1425 714/4.5 |
| 2016/0261727 A1* | 9/2016 | Yang | G06F 11/2035 |
| 2018/0278579 A1* | 9/2018 | Sananes | H04L 63/02 |

(Continued)

OTHER PUBLICATIONS

IBM. "Security for IBM Cloud Kubernetes Service". Aug. 14, 2020 (Archive.org). pp. 1-20. (Year: 2020).*

(Continued)

*Primary Examiner* — Imad Hussain
(74) *Attorney, Agent, or Firm* — Zilka-Kotab, P.C.

(57) ABSTRACT

A computer-implemented method according to one embodiment includes establishing a handshake between a security and compliance center (SCC) and a first operator of a first cluster via a manager component therebetween. An operand mapping of the SCC is updated, and the established handshake is used to cause the update to be communicated to the first operator of the first cluster. A computer program product according to another embodiment includes a computer readable storage medium having program instructions embodied therewith. The program instructions are readable and/or executable by a computer to cause the computer to perform the foregoing method. A system according to another embodiment includes a processor, and logic integrated with the processor, executable by the processor, or integrated with and executable by the processor. The logic is configured to perform the foregoing method.

20 Claims, 4 Drawing Sheets

(56) References Cited

U.S. PATENT DOCUMENTS

2020/0159959 A1    5/2020  Larson et al.
2023/0216890 A1*   7/2023  Kairali .................. H04W 12/37
                                                              726/1

OTHER PUBLICATIONS

Anonymous, "Secure and Smart Routing of Security Posture Based on Sensitivity of Findings and Risk of Connections in Edge Computing via Intelligent Handshakes," IP.com Prior Art Database, Technical Disclosure No. PCOM000269073D, Mar. 19, 2022, 5 pages.

Todhunter et al., "Anchore Engine Helm Operator," GitHub, Oct. 8, 2021, 5 pages, retrieved from https://github.com/anchore/engine-operator#readme.

IBM, "IBM Cloud Security and Compliance Center," IBM, 2022, 6 pages, retrieved from https://www.ibm.com/cloud/security-and-compliance-center on Jul. 25, 2022.

NIST, "FIPS 200 Minimum Security Requirements for Federal Information and Information Systems," NIST Computer Security Resource Center, Mar. 2006, 3 pages, retrieved from https://csrc.nist.gov/publications/detail/fips/200/final on Jul. 25, 2022.

* cited by examiner

USING A HANDSHAKE TO COMMUNICATE BETWEEN A SECURITY AND COMPLIANCE CENTER (SCC) AND AT LEAST A FIRST OPERATOR

BACKGROUND

The present invention relates to container orchestration systems, and more specifically, this invention relates to establishing and using a handshake between a security and compliance center (SCC) and at least a first operator of a first cluster via a manager component therebetween.

Some operator patterns aim to capture a key aim of a human operator that manages a service or set of services. Human operators that look after specific applications and services typically have a deep knowledge of how the system should behave, how to deploy the system, and how the system reacts in the event that problems arise.

Use of automation to take care of repeatable tasks is often implemented on workloads that are run on a container orchestration system, e.g., such as Kubernetes. An operator pattern may capture techniques of writing code to automate a task beyond what the container orchestration system itself provides.

One example of use of operators in a container orchestration system occurs within Kubernetes. Kubernetes is designed for automation. The product at an outset includes an extensive amount of built-in automation from the core of Kubernetes. Kubernetes may be used to automate deploying and running workloads, and techniques used by Kubernetes to implement such workloads may be automated.

An operator pattern concept of Kubernetes allows behavior of a cluster to be extended without modifying code of Kubernetes itself by linking controllers to one or more custom resources. In this particular example, the operators are clients of the Kubernetes application programming interface (API) that act as controllers for a custom resource.

SUMMARY

A computer-implemented method according to one embodiment includes establishing a handshake between a security and compliance center (SCC) and a first operator of a first cluster via a manager component therebetween. An operand mapping of the SCC is updated, and the established handshake is used to cause the update to be communicated to the first operator of the first cluster.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
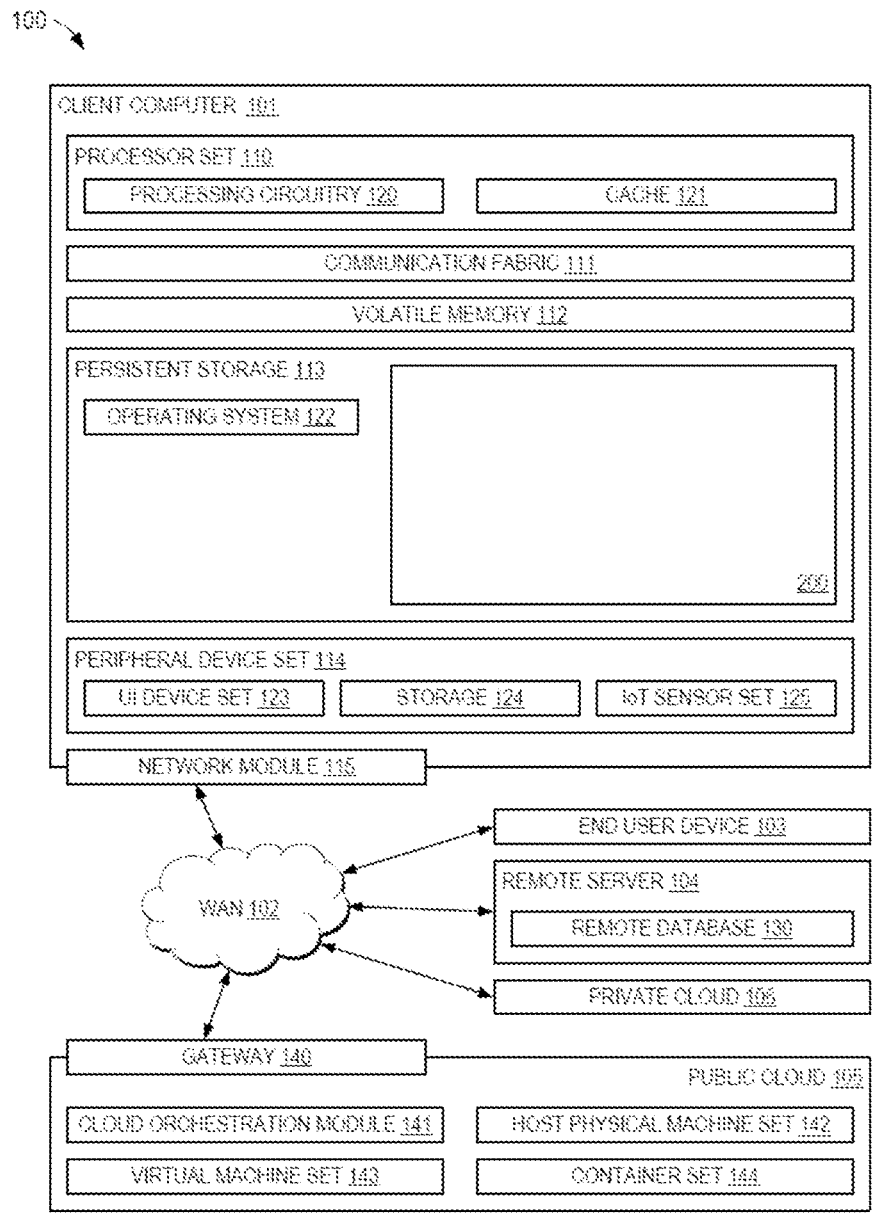
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using a handshake to communicate between a SCC and at least a first operator of a first cluster.

In one general embodiment, a computer-implemented method includes establishing a handshake between a security and compliance center (SCC) and a first operator of a first cluster via a manager component therebetween. An operand mapping of the SCC is updated, and the established handshake is used to cause the update to be communicated to the first operator of the first cluster.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as block 200 configured to establish and use a handshake between a SCC and at least a first operator of a first cluster via a manager component therebetween. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As mentioned elsewhere above, some operator patterns aim to capture a key aim of a human operator that manages a service or set of services. Human operators that look after specific applications and services typically have a deep knowledge of how the system should behave, how to deploy the system, and how the system reacts in the event that problems arise.

Use of automation to take care of repeatable tasks is often implemented on workloads that are run on a container orchestration system, e.g., such as Kubernetes. An operator pattern may capture techniques of writing code to automate a task beyond what the container orchestration system itself provides.

One example of use of operators in a container orchestration system occurs within Kubernetes. Kubernetes is designed for automation. The product at an outset includes an extensive amount of built-in automation from the core of Kubernetes. Kubernetes may be used to automate deploying and running workloads, and techniques used by Kubernetes to implement such workloads may be automated.

An operator pattern concept of Kubernetes allows behavior of a cluster to be extended without modifying code of Kubernetes itself by linking controllers to one or more custom resources. In this particular example, the operators are clients of the Kubernetes application programming interface (API) that act as controllers for a custom resource.

In some environments, e.g., such as an enterprise cloud environment, an "operand" may be a managed workload provided by an operator as a service. An operator is a computer-based workload that manages other computer-based workloads. "Managed resources" may include container orchestration system objects or off-cluster services that the operator uses to constitute an operand. Managed resources are also sometimes referred to as "secondary resources."

In any enterprise cloud environment, there may be a centralized place for security and compliance management. While security and compliance rules, polices and profiles may be created in a SCC, changes to operands are intended to be initiated via operators. For example, a change of the operands may include a change to SCC rules. However, these changes are not visible to operators, as conventional techniques include a disconnect between operators and changes to operands. This essentially means that in the event that any change is made to SCC rules, e.g., where the change has some implications to operands deployments directly or indirectly, an admin is conventionally relied on to change the operator version for the change to take effect. This is time consuming and creates a dependency on intervention of experienced admin(s).

In sharp contrast to the deficiencies of the conventional techniques described above, various embodiments and approaches described herein enable a centralized and intelligent operator management for distributed cloud deployments. This improves security updates of operands in that the updates are implemented without a dependency on admin(s). More specifically, rather than externalizing configurations which deploy a workload, in various of the embodiments and approaches described herein implement a workload that manages other workloads, e.g., operands, in such a way that the operands are managed by the workload for a lifecycle of the operands. For example, a create command may be sent to cause a first operator to pickup and create an operand. Further management of the lifecycle of the operand may also be performed using the operator, e.g., listing the operand, deleting the operand, etc.

Figure 2:
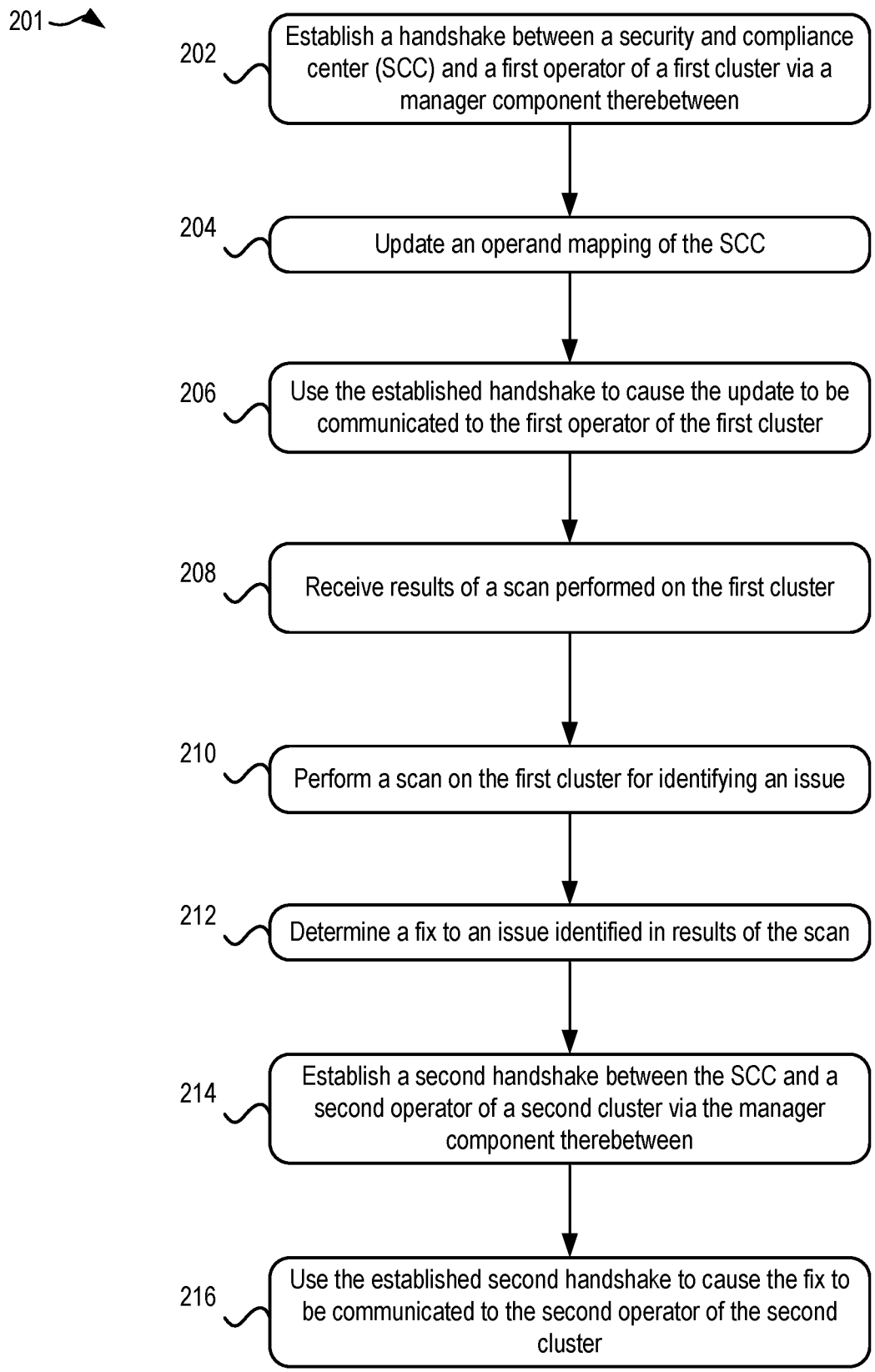
FIG. 2 is a flowchart of a method, in accordance with one embodiment of the present invention.

Now referring to FIG. 2, a flowchart of a method 201 is shown according to one embodiment. The method 201 may be performed in accordance with the present invention in any of the environments depicted in FIGS. 1-4 among others, in various embodiments. Of course, more or fewer operations than those specifically described in FIG. 2 may be included in method 201, as would be understood by one of skill in the art upon reading the present descriptions.

Each of the steps of the method 201 may be performed by any suitable component of the operating environment. For example, in various embodiments, the method 201 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 201. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes establishing a handshake between a SCC and a first operator of a first cluster via a manager component therebetween. One or more techniques that would become apparent to one of ordinary skill in the art upon reading the descriptions herein may be utilized for establishing the handshake between the SCC and the first operator of the first cluster via the manager component.

The SCC and the first cluster are in some preferred approaches in the same network environment. Furthermore, the first cluster preferably includes at least one operand managed by the first operator. The first cluster may in some approaches additionally and/or alternatively includes a plurality of operands that are managed by the first operator. Note that, the network environment may in some approaches include more than the first cluster, e.g., a second cluster having an operator that manages one or more operands of the second cluster, a third cluster having an operator that manages one or more operands of the third cluster, a $N^{th}$ cluster having an operator that manages one or more operands of the $N^{th}$ cluster, etc.

The clusters may be devices and/or computing platforms that are clients of the SCC. In a relatively broader approach, one or more of the clusters may be cloud environments that include one or more devices. At least some of the clusters may in some approaches be cloud-based clusters, e.g., such as known types of on-demand cloud computing platforms. In some other approaches some of the clusters may be cloud-based clusters and some of the other clusters may be local clusters, e.g., known types of computing platforms geographically proximate to the SCC, such as in a hybrid network. As mentioned elsewhere above, the operand" may be a managed workload provided by an operator as a service in some approaches. The operand may be of a known type. An operator is a workload that manages other workloads, and here may be of a known type. "Managed resources" may include container orchestration system objects or off-cluster services that the operator uses to constitute an operand. Managed resources are also sometimes referred to as "secondary resources."

In some approaches establishing the handshake between the SCC and the first operator of the first cluster may include adding a SCC operator manager component and/or executable logic that is configured to communicate with the SCC and is configured to communicate with one or more operators of one or more clusters in the network environment that includes the clusters and the SCC. Furthermore, in some approaches, an agent of the manager may be added to one or more of the clusters, e.g., see FIG. 4, that enables bidirectional communication between the SCC and operators of the clusters. The agents in some approaches are enabled to view all of the workloads of the operators and the operands and communicate findings with the manager component of the SCC. Such agents may be of a type that would become apparent to one of ordinary skill in the art upon reading the descriptions herein. According to some more specific approaches, the agent may be configured to communicate with an operator and/or an agent of the cluster. However, depending on the approach, the agent may be optionally restricted from viewing one or more aspects of the cluster.

As a result of establishing the manager component between the SCC and clusters that include operators that manage operands, operators and/or an agent of the cluster effectively gain the ability to handshake with the SCC. More specifically, the operators are preferably able to communicate with the SCC and vice versa as a result of the manager component establishing the handshake. The SCC which manages cloud security preferably is able to talk to operator and/or an agent as well. This allows an operator to receive updates on rules, controls, and policies for each operand.

In some preferred approaches, the manager component may be a module in the SCC that is configured to ongoingly communicate with all deployed operators of the network environment and during such communication, e.g., cause updates to network rules, policies, or configurations in operands, cause redeployment of an operator if called for with implementation of a new version, redeploy of an operator itself, etc. Similar communications will be described in greater detail in various illustrative approaches and examples described elsewhere below.

As a result of establishing the handshake, communications that manage operand SCC rules and policy mapping are able to be relayed between the SCC and operators of clusters by use of the manager component. As a result, SCC is enabled with an ability to manage a mapping between various operands and associated versions in addition to SCC controls, policies, and configurations. It should be noted such management and communication is not enabled in conventional networks. In sharp contrast, in conventional embodiments, changes of operands, e.g., a change to SCC rules are not visible to operators because of the disconnect between operators and changes to operands made on the SCC. Accordingly, the techniques described herein with regards to using a manager component to establish a handshake between a SCC and at least a first operator of a first cluster proceed contrary to conventional wisdom.

The SCC is enabled to manage a mapping between various operands and associated versions in addition to SCC controls, policies, and configurations by using the handshake established by the management component. Various illustrative approaches detailing such management are described below, e.g., see operation 204-operation 216.

The SCC may include an operand mapping in some approaches. The operand mapping may include, e.g., SCC policies, rules, configurations, etc., for operands of clusters that are in communication with the SCC via the manager component, e.g., such as the first operand of the first cluster. Operation 204 includes updating an operand mapping of the SCC. In one approach, the update includes an update to a network rule. For example, the updated network rule may change a number of tasks of an operand that may be concurrently performed by an operator that manages the operand. In another example, the updated network rule may change a period of time that the operator is able to perform processing operations on an operand, e.g., such as reserving some types of processing for a period of time in which relatively more processing resources are available. According to another approach, the update may additionally and/or alternatively include an update to controls. In one approach, a control that may be updated includes a control family and/or access control. In one such example, upon an access control being updated, additional rules may be added which may call for a restart of an operand. According to yet another approach, the update may additionally and/or alternatively include an update to policies, e.g., such as security policies, a list of trusted ports of the network, a list of types of processing that is restricted to be performed by one or more operators, how often for the operand to be restarted, scheduled downtime for the operand, etc. The update may additionally and/or alternatively include an update to configurations in operands, e.g., to reflect one or more operands that have been added to the network environment, to reflect one or more operands that have been removed from the network environment, etc.

Operation 206 includes using the established handshake to cause the update to be communicated to the first operator and/or the agent of the first cluster. More specifically, in some approaches, the manager component may be used to ensure that SCC updates are promptly provided to and/or implemented on operands managed by operators. Various illustrative approaches described below note operations that may be performed to use the established handshake to cause an update to be communicated to one or more operators and/or agents of the clusters.

In one approach, it may be assumed that the update includes a change to a rule and/or policy of the operand. The change may first be reflected to an operand mapping, e.g., such as in response to the SCC receiving a request from an administrator device and/or known type of reinforcement learning algorithm to update the rule and/or policy of the operand. In some approaches, the change to the operand mapping may be detected and thereafter posted on the manager component and/or send to one or more operators from the SCC using the manager component and/or handshakes. In another approach, the update the rule and/or policy of the operand may be fed to the manager component SCC by a controller component of the SCC. In yet another approach, the update the rule and/or policy of the operand may be identified within the operand mapping of the SCC in response to receiving, by the manager component, a request from one or more operators.

For example, in some approaches, the established handshake is used to cause the update to be communicated to the first operator in response to receiving, e.g., by the manager component from the first operator, a request for up to date/a most recent version of rules of the SCC. One or more of the operators may periodically make such a request in some approaches. In some other approaches the operators may make the request a single time subsequent to a most previously performed update, e.g., a standing request for updates.

It may be determined whether redeployment of the first operator is required to cause the change to the rule and/or policy to be applied to the operand of the first cluster. Note that a redeployment may not necessarily be "required," in some approaches, but instead called for in order for the change to be applied on the cluster. A redeployment may be particularly applicable where the change includes an update to code of the operand.

In some approaches, information provided to the operator from the manager component may specify whether a redeployment is to be performed in order to apply the updated rule and/or policy to the operand. For example, in one approach, the update communicated to the first operator and/or an agent of the first cluster may indicate whether to apply a restart to the operand in conjunction with applying the update to the operand. In one or more of such approaches, the information may originate from the SCC and/or be generated by the manager component. In some other approaches, information specifying whether a redeployment is to be performed in order to apply the updated rule is not provided to the operator and/or the agent. Instead, in some approaches the operator is instructed to determine whether to perform a redeployment, e.g., such as in response to an instruction being output from the manager component to the operator to make such a determination. One or more periods of downtime of the cluster may be identified, e.g., such as by the operator, during which a restart may be performed. This enables the update to be applied without performance costs as the cluster is already scheduled to be down when the restart is applied. Note that the instruction may additionally and/or alternatively include an instruction for the operator to apply the updated rule and/or policy to the operand, e.g., such as during an identified period of downtime.

In response to a determination that redeployment of the first operator is required, the rule is caused to be applied to the operand and the operand is caused to be restarted. Note that application of the rule and/or the restart may be caused to occur in response to an instruction being issued to the operators of clusters where the restart and/or change is to be applied. One or more techniques that would become apparent to one of ordinary skill in the art upon reading the descriptions herein may be utilized for restarting the operand of the first cluster. In contrast, in response to a determination that redeployment of the first operator is not required, the rule may be caused to be applied to the operand of the first cluster.

It should be noted that although various operations of method 201 are described to be performed with respect to the "first cluster," a handshake may additionally and/or alternatively be established between the SCC and other operators and/or agents, e.g., a second operator of a second cluster, a third operator of a third cluster, etc. In some approaches, one or more other operators may be included into the network that includes the SCC as a result of clusters that include the one or more other operators being added to the network that includes the SCC. For example, in some approaches method 201 may additionally and/or alternatively include identifying installation of a second operator of a second cluster in the network that includes the SCC and the first cluster and the second cluster. A handshake, e.g., a second handshake that is different than the first handshake, may be established between the SCC and the second operator via the manager component therebetween, e.g., see operation 214. Various operations described herein to be performed with respect to the first cluster may additionally and/or alternatively be performed with respect to, e.g., a second operator of a second cluster, a third operator of a third cluster, an operator of an $N^{th}$ cluster etc. This process may be referred to as common rule extraction, in that upon it being determined that a new operator has been installed in the network, the operator is in some approaches able to identify common rules that have been applied by one or more other operators in operands managed by the other operators. This is enabled as result of the manager component forming a communication handshake between operators and the SCC, and is not otherwise available in conventional network practices. For example, the established handshake between the SCC and the second operator may be used to cause an update to be communicated to the second operator, e.g., such as the update of operation 206.

Automated rule identification and optionally broadcasting the rule to other operators and/or the SCC is also enabled as a result of using various of the techniques described herein to implement the manger component between the SCC and one or more operators of clusters. Results of a scan performed on the first cluster may be received, e.g., see operation 208. In one illustrative approach method 201 includes performing a scan on the first cluster for identifying whether an issue is present, e.g., see operation 210. It may be determined whether an issue is present and identifiable within results of the scan performed on the first cluster. The scan may in some approaches be performed by the agent. In some other approaches, the scan may be performed by an operator of the cluster. The scan may be preconfigured to identify one or more conditions in clusters of the network environment and may be implemented using a type of scan that would become apparent to one of ordinary skill in the art upon reading the descriptions herein. In another approach, the scan may be preconfigured to identify one or more issues that are being reported to one or more of the operands. The issues may include, e.g., a cluster underperforming as a result of a most recent update not being applied by an operator to an operand of the cluster, operations of the operand of the cluster jeopardizing the privacy and/or security of the cluster, a cluster interacting with a port and/or device where the port and/or device no longer has accepted credentials, a relatively latest field issue, a known type of security issue, etc. The SCC is in some approaches enabled to detect such issues and therefore the scan may be performed on the first cluster in response to receiving, by the manager component and/or by the first operator and/or an agent of the cluster, an instruction from the SCC to perform the scan. The SCC may be configured to periodically make such a request in order to ensure that rules and policies being used on one of more clusters in the network environment are not causing an issue that is detrimental to performance of the network.

A fix to an issue identified in results of the scan may be determined, e.g., see operation 212. In some approaches, the fix may be identified as a fix that is already being applied on the operand that the issue is reported on. In another approach, the fix may additionally and/or alternatively be generated by the SCC and received by the manager component for delivering to one or more operators managing one or more operands that are experiencing the issue. In yet another approach, the fix may be determined from a predetermined table that includes a plurality of fixes pre-associated with a plurality of issues. The fix may be caused to be communicated to one or more agents and/or operators that manage clusters that are experiencing the issue. For example, in one approach, method 201 may include using the established second handshake to cause the fix to be communicated to the second operator of the second cluster, e.g., see operation 216. Method 201 may additionally and/or alternatively include using the established first handshake to cause the fix to be communicated to the first operator of the first cluster.

In one illustrative approach, the SCC detects whether one or more issues are being reported in operands. In response to a determination that a fix has been applied to more than one operand, e.g., which may be determined by the SCC based on information communicated from an agent to the SCC using the handshake, the fix may be determined to be a common fix that is applicable to more than one other operators. Accordingly, method 201 may include causing the fix to be applied to one or more other operands. For example, in one approach, the fix may be broadcast to all operators in the network environment that have a handshake established with the SCC via the manager component therebetween. This ensures that the fix is securely sent, but in a timely manner by being concurrently sent to operators that the fix will thereafter be used by.

Various benefits are enabled as a result of implementing the techniques described in various embodiments and approaches described herein. For example, network environments that implement these techniques experience improvements to computer processing when compared to conventional techniques. In conventional network environments, changes to SCC rules are not visible to operators because of the disconnect between operators and changes to operands made on the SCC. Accordingly, computer processing within conventional network environments is unideal in that these changes not realized by operators for some time. In sharp contrast, using the techniques of various embodiments and approaches described herein, such SCC changes are relayed without to the operators upon being made based on established handshakes between the SCC and one or more operators that manage operands. Accordingly, the updates are promptly populated to operators and operands. This also strengthens the security of the network environment based on security policy updates and/or fixes being promptly communicated to the operators, in addition to issues being additionally and/or alternatively communicated to the SCC from the clusters.

Figure 3:
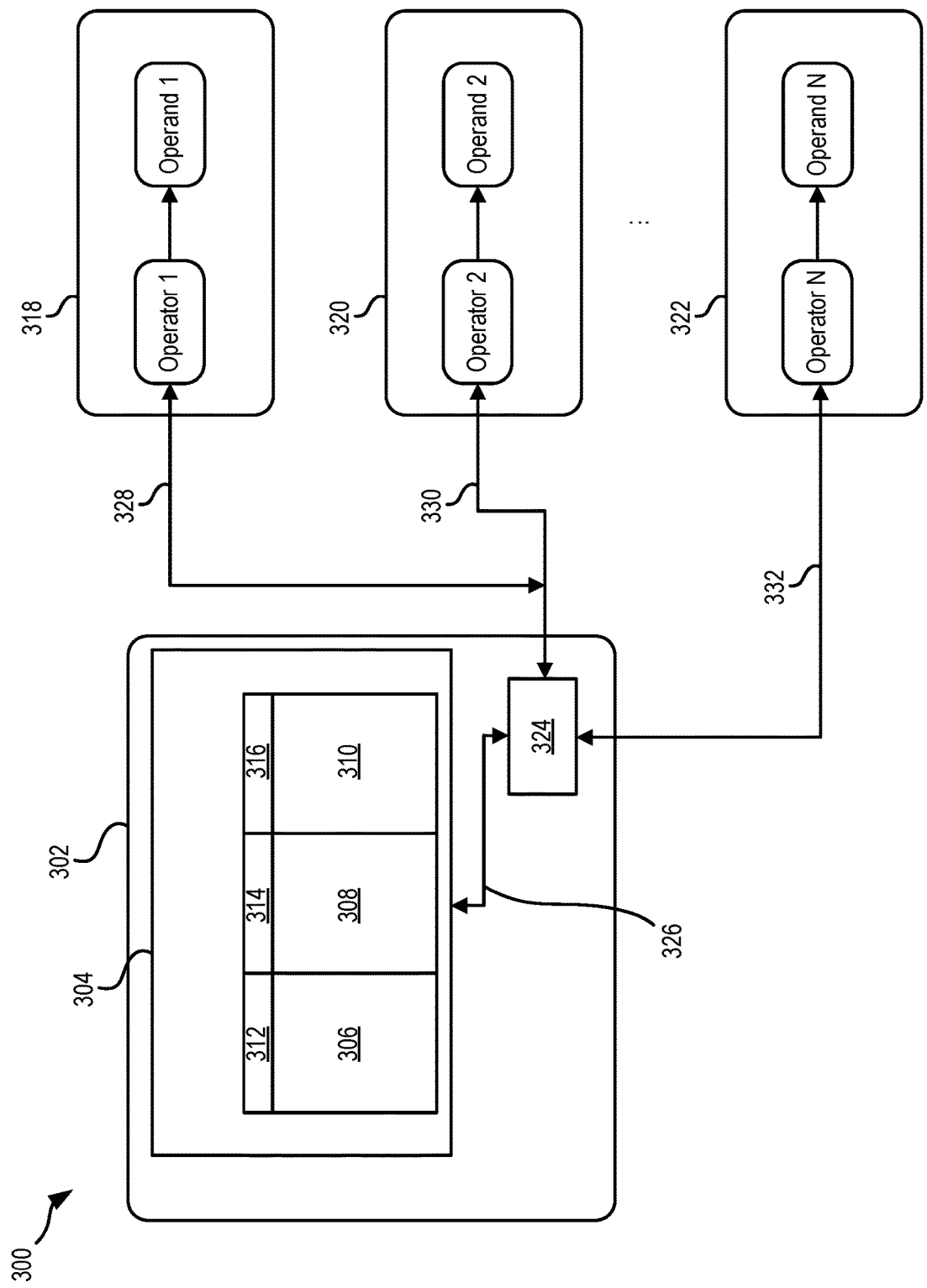
FIG. 3 is a network environment, in accordance with one embodiment of the present invention.

FIG. 3 depicts a network environment 300, in accordance with one embodiment. As an option, the present network environment 300 may be implemented in conjunction with features from any other embodiment listed herein, such as those described with reference to the other FIGS. Of course, however, such network environment 300 and others presented herein may be used in various applications and/or in permutations which may or may not be specifically described in the illustrative embodiments listed herein. Further, the network environment 300 presented herein may be used in any desired environment.

In some approaches the network environment 300 may be a known type of operator based deployment environment with added enhancements such as a management component and/or established connections described below. The network environment 300 includes a SCC 302. In some approaches the SCC 302 includes an operand mapping 304. The operand mapping 304 of the SCC 302 may include information 306, 308, 310 that corresponds with different operands of clusters of the network environment 300. The operand mapping 304 may be a mapping between operands, versions of the operands, controls policies, etc., in terms of goals of the SCC 302. More specifically, in some approaches, the information may in some approaches include, e.g., SCC rules, policies, updates, etc. In one example, the information 306 includes an indication 312 in the operand mapping 304 that the information 306 corresponds to an operand, e.g., see Operand 1, that is managed by Operator 1 in a first cluster 318 of the network environment 300. In another example, the information 308 includes an indication 314 in the operand mapping 304 that the information 308 corresponds to an operand, e.g., see Operand 2, that is managed by Operator 2 in a second cluster 320 of the network environment 300. In yet another example, the information 310 includes an indication 316 in the operand mapping 304 that the information 310 corresponds to an $N^{th}$ operand, e.g., see Operand N, which is managed by Operator N in an $N^{th}$ cluster 322 of the network environment 300.

The network environment 300 includes a handshake, e.g., see communication lines 326 and 328 established between the SCC 302 and the operator, e.g., Operator 1, via a manager component 324 therebetween. Additionally, the network environment 300 includes a handshake, e.g., see communication lines 326 and 330 established between the SCC 302 and the operator, e.g., Operator 2, via the manager component 324 therebetween. Yet furthermore, the network environment 300 includes a handshake, e.g., see communication lines 326 and 332 established between the SCC 302 and the operator, e.g., Operator N, via the manager component 324 therebetween.

In some approaches, a capability may be enabled that allows the SCC 302 to receive security findings, e.g., such as SECURITY INSIGHTS in IBM's SCC, from one or more of the clusters, e.g., via the manager component and established handshakes. The operand mapping 304 of the SCC 302 may additionally and/or alternatively be updated, e.g., such as in response to receiving an instruction from an administrator device to update rules of the operand mapping 304 in accordance with standard SCC operation, and the established handshake may be used to cause the update to be communicated to one or more of the operators. Upon a determination being made, e.g., by the SCC 302, that a rule is being updated, and that implications result from the update, e.g., updates are to be populated to the Operands 1-N, a most recent operand version may be sent to the Operators 1-N, e.g., via the via the manager component 324 and the handshakes that allow the Operators 1-N to handshake with the SCC 302. In some approaches, in response to a determination, e.g., by the manager component 324 and/or an operator, that an operand version of one or more of the operators and/or managed operands is impacted by the change, in some approaches one or more of the operators may initiate pulling the latest changes in the rules from the SCC 302. For example, the operators that manages an operand that is impacted by the change may issue a request for updated rules from the SCC 302. In another approach, the updated rules may be posed for an operator to pull from. In yet another approach, the rules may be output by the SCC 302 and/or the manager component 324 of the SCC 302 to one or more operators, e.g., such as in response to a request for a latest rule. In some approaches, the application of the rules in the operand may call for a restart of the operand. In some approaches this may be determined by the SCC 302. In some other approaches this may be determined by the operator, e.g., such as based on instructions received from the SCC 302. In response to a determination that a restart of the operand is not called for, the operand may be caused, e.g., instructed, to apply the different rule. In contrast, in response to a determination that a restart of the operand is called for, the operand may be caused to apply the different rule and thereafter restart the operand.

In some approaches, based on the security findings, operand security issues and/or compliance violations may be analyzed. In some approaches security findings are delivered to the SCC 302 and the SCC 302 is instructed to perform such analysis. In some other approaches the security findings may be output to a predetermined type of processing algorithm that is configured to analyze operand security issues and/or compliance violations. In response to a determination that more than one of the operands have a common security issue that has been reported, it may be determined whether any new rule is being applied to the operands. For example, this check may be performed in response to the SCC 302 requesting rules that are being applied to operands on clusters that have had the security issue reported. In response to a commonality being detected with regards to the rule being applied and/or a fix, e.g., such as a rule change, being applied to successfully combat the security issue, the commonality may be broadcast to apply changes to all operators in the network environment 300. This would allow at least some of the operators to apply such common changes even before experiencing the security issue.

In some approaches, in response to a determination that a new operator has been installed in a cluster of the network environment 300 and/or that an operand is being installed, common rules may be selected from the SCC 302 to use, even assuming that an administrator device has not set any rules to use.

Figure 4:
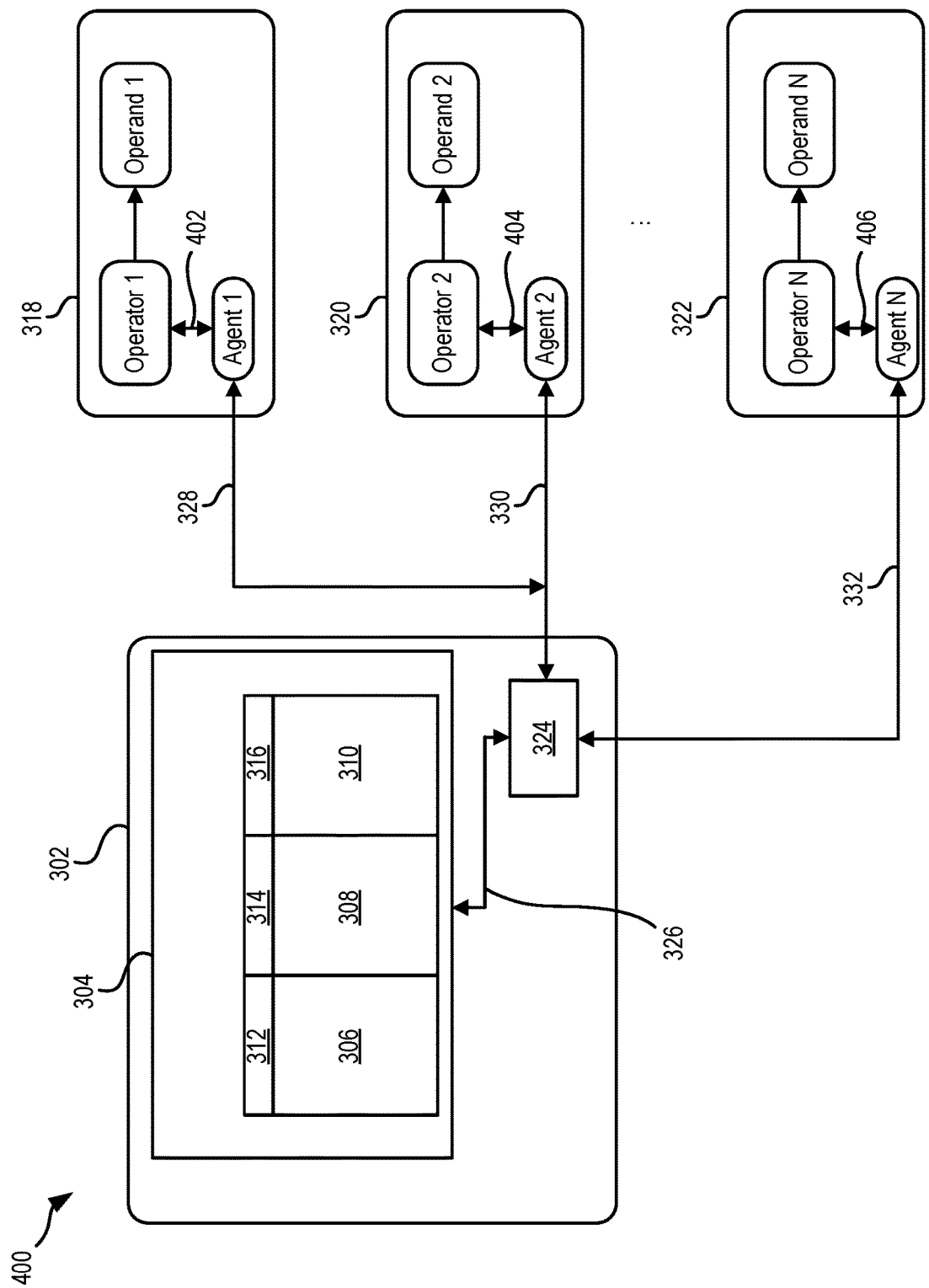
FIG. 4 is a network environment, in accordance with one embodiment of the present invention.

FIG. 4 depicts a network environment 400, in accordance with one embodiment. As an option, the present network environment 400 may be implemented in conjunction with features from any other embodiment listed herein, such as those described with reference to the other FIGS. Of course, however, such network environment 400 and others presented herein may be used in various applications and/or in permutations which may or may not be specifically described in the illustrative embodiments listed herein. Further, the network environment 400 presented herein may be used in any desired environment.

It should be prefaced that various of the components of the network environment 400 are similar to various of the components of the network environment 300, and therefore the network environment 400 and the network environment 300 include some common numberings.

One difference between the network environment 400 and the network environment 300 is that the network environment 400 includes a plurality of agents, e.g., see Agent 1, Agent 2 and Agent N. The agents help establish a handshake between SCC 302 and operators. For example, the network environment 400 includes a handshake, e.g., see communication lines 326, 328 and 402 established between the SCC 302 and the Operator 1. In another example, the network environment 400 includes a handshake, e.g., see communication lines 326, 330 and 404 established between the SCC 302 and the Operator 2. In yet another example, the network environment 400 includes a handshake, e.g., see communication lines 326, 332 and 406 established between the SCC 302 and the Operator N.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   establishing a handshake between a security and compliance center (SCC) and a first operator of a first cluster via a manager component therebetween,
   wherein the first cluster includes a first operand managed by the first operator;
   updating an operand mapping of the SCC,
   wherein the update includes a change to a rule of the first operand; and
   using the established handshake to cause the update to be communicated to the first operator of the first cluster.

2. The computer-implemented method of claim 1, wherein the update comprises an updated network rule and an update to controls.

3. The computer-implemented method of claim 2, wherein the controls include a control family, wherein the network rule includes a security policy.

4. The computer-implemented method of claim 1, comprising:
   determining whether redeployment of the first operator is required to cause the change to the rule to be applied to the first operand of the first cluster;

in response to a determination that redeployment of the first operator is required, causing the rule to be applied to the first operand and causing the first operand to restart; and in response to a determination that redeployment of the first operator is not required, causing the rule to be applied to the first operand, wherein information is communicated to the first operator in addition to the update, wherein the information specifies whether redeployment of the first operator is required.

5. The computer-implemented method of claim 1, comprising:

in response to an issue being identified within results of a scan performed on the first cluster, determining a fix to the issue, wherein the fix is being applied on the first operand;

establishing a second handshake between the SCC and a second operator of a second cluster via the manager component therebetween; and using the established second handshake to cause the fix to be communicated to the second operator of the second cluster.

6. The computer-implemented method of claim 1, wherein the update communicated to the first operator indicates whether to apply a restart to the first operand in conjunction with applying the update to the first operand.

7. The computer-implemented method of claim 1, comprising:

identifying installation of a second operator of a second cluster in a network that includes the SCC;

establishing a second handshake between the SCC and the second operator via the manager component therebetween; and using the established second handshake to cause the update to be communicated to the second operator.

8. The computer-implemented method of claim 1, wherein the established handshake is used to cause the update to be communicated to the first operator in response to receiving, from the first operator, a request for rules of the SCC.

9. The computer-implemented method of claim 1, wherein the first cluster includes a plurality of operands that are managed by the first operator, wherein the plurality of operands includes the first operand.

10. A computer program product, the computer program product comprising a non-transitory computer readable storage medium having program instructions embodied therewith, the program instructions readable and/or executable by a computer to cause the computer to:

establish, by the computer, a handshake between a security and compliance center (SCC) and a first operator of a first cluster via a manager component therebetween, wherein the first cluster includes a first operand managed by the first operator;

update, by the computer, an operand mapping of the SCC, wherein the update includes a change to a rule of the first operand; and use, by the computer, the established handshake to cause the update to be communicated to the first operator of the first cluster.

11. The computer program product of claim 10, wherein the update comprises an updated network rule and an update to controls.

12. The computer program product of claim 11, wherein the controls include a control family, wherein the network rule includes a security policy.

13. The computer program product of claim 10, the program instructions readable and/or executable by the computer to cause the computer to:

determine, by the computer, whether redeployment of the first operator is required to cause the change to the rule to be applied to the first operand of the first cluster;

in response to a determination that redeployment of the first operator is required, causing the rule to be applied to the first operand and causing the first operand to restart; and in response to a determination that redeployment of the first operator is not required, causing the rule to be applied to the first operand, wherein information is communicated to the first operator in addition to the update, wherein the information specifies whether redeployment of the first operator is required.

14. The computer program product of claim 10, the program instructions readable and/or executable by the computer to cause the computer to:

in response to an issue being identified within results of a scan performed on the first cluster, determine, by the computer, a fix to the issue, wherein the fix is being applied on the first operand;

establish, by the computer, a second handshake between the SCC and a second operator of a second cluster via the manager component therebetween; and use, by the computer, the established second handshake to cause the fix to be communicated to the second operator of the second cluster.

15. The computer program product of claim 10, wherein the update communicated to the first operator indicates whether to apply a restart to the first operand in conjunction with applying the update to the first operand.

16. The computer program product of claim 10, the program instructions readable and/or executable by the computer to cause the computer to:

identify, by the computer, installation of a second operator of a second cluster in a network that includes the SCC;

establish, by the computer, a second handshake between the SCC and the second operator via the manager component therebetween; and use, by the computer, the established second handshake to cause the update to be communicated to the second operator.

17. The computer program product of claim 10, wherein the established handshake is used to cause the update to be communicated to the first operator in response to receiving, from the first operator, a request for rules of the SCC.

18. The computer program product of claim 10, wherein the first cluster includes a plurality of operands that are managed by the first operator, wherein the plurality of operands includes the first operand.

19. A system, comprising:

a processor; and logic integrated with the processor, executable by the processor, or integrated with and executable by the processor, the logic being configured to:

establish a handshake between a security and compliance center (SCC) and a first operator of a first cluster via a manager component therebetween, wherein the first cluster includes a first operand managed by the first operator;

update an operand mapping of the SCC, wherein the update includes a change to a rule of the first operand; and use the established handshake to cause the update to be communicated to the first operator of the first cluster.

20. The system of claim 19, wherein the update comprises an updated network rule and/or an update to controls.

\* \* \* \* \*